Figure 1:
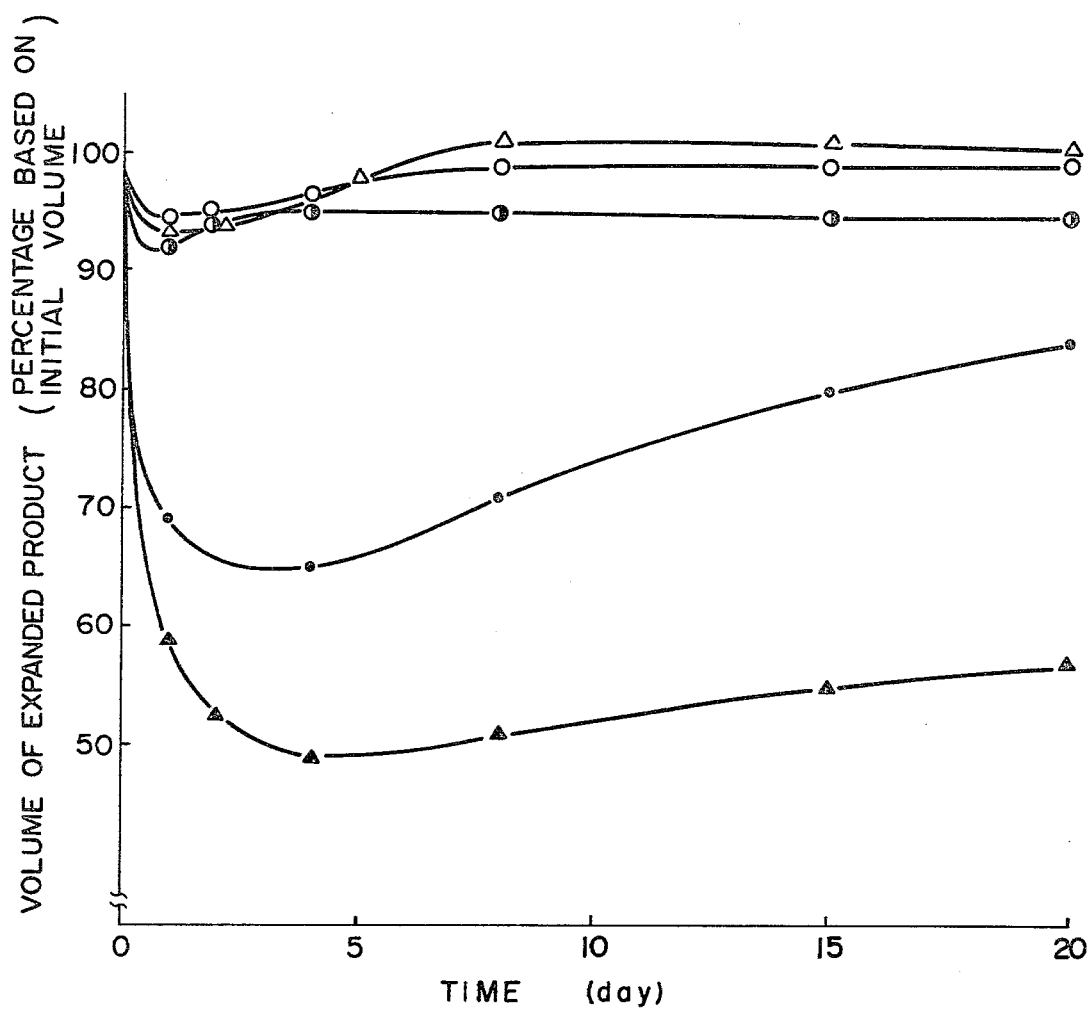

United States Patent

Watanabe et al.

[11] 4,214,054
[45] Jul. 22, 1980

[54] EXPANDED OLEFIN POLYMER

[75] Inventors: Seizaburo Watanabe; Yutaka Matsuki, both of Suzuka, Japan

[73] Assignee: Asahi-Dow Limited, Tokyo, Japan

[21] Appl. No.: 952,865

[22] Filed: Oct. 19, 1978

[51] Int. Cl.$^2$ .............................................. C08J 9/14
[52] U.S. Cl. ............................................ 521/95; 521/79; 521/143; 521/144; 521/145; 521/149; 525/5; 525/6
[58] Field of Search .................. 521/143, 149, 94; 526/6, 5

[56] References Cited

U.S. PATENT DOCUMENTS

| | | | |
|---|---|---|---|
| 2,804,435 | 8/1957 | Reed | 521/143 |
| 3,017,371 | 1/1962 | Hohenberg et al. | 521/143 |
| 3,441,553 | 4/1969 | Rombusch et al. | 526/5 |
| 3,485,786 | 12/1969 | Rombusch et al. | 526/6 |
| 3,519,578 | 7/1970 | Allen et al. | 521/143 |
| 3,882,209 | 5/1975 | Yanagisawa et al. | 521/94 |
| 3,975,325 | 8/1976 | Long, Jr. | 526/6 |
| 4,070,531 | 1/1978 | Schwarze et al. | 526/5 |

Primary Examiner—Morton Foelak
Attorney, Agent, or Firm—Tai-Sam Choo

[57] ABSTRACT

A thermoplastic synthetic resin such as polyethylene or ethylene-vinyl acetate copolymer resin containing 0.1 to 10 wt. % of a specific additive selected from specific classes of compounds, namely saturated higher fatty acid amides, saturated higher aliphatic amines and complete esters of saturated higher fatty acids is found to be very suitable for production of expanded articles and can be easily formed into expanded articles with little shrinkage after expansion, free from creases on the surface or cracks on the cell walls, and having excellent characteristics such as good closed cellular characteristic, higher compressive strength, low density, etc.

6 Claims, 5 Drawing Figures

EXPANDED OLEFIN POLYMER

This invention relates to a novel thermoplastic synthetic resin composition suitable for manufacturing expanded products of various kinds, which contains at least one compound selected from specific classes of compounds. This invention relates also to a process for expanding such a novel thermoplastic synthetic resin composition and to expanded products of a polyolefin resin obtained by such a process having excellent characteristics.

A thermoplastic synthetic resin of which expansion molding is difficult, for example, a polyolefin resin is known to be inferior in retentivity of gases such as of blowing agents as compared with such a resin as polystyrene resin.

Typical well-known methods of prior art for improvement of expandability of polyolefin resins may be classified broadly into four methods as follows:

(1) A method as disclosed by Japanese published examined patent applications No. 8840/1965 and No. 6278/1966, wherein the starting resin is subjected to crosslinking;

(2) A method as disclosed by U.S. Pat. No. 3,810,964, wherein the starting resin is mixed with a resin other than polyolefin resins;

(3) A method as disclosed by Japanese published examined patent applications No. 4341/1960 and No. 19628/1972, wherein there is employed a blowing agent with a composition and components specifically selected; and (4) A method as disclosed by Japanese published examined patent applications No. 43997/1971 and No. 43998/1971, wherein there is added in the starting resin a partial ester of a specific polyhydric alcohol.

These methods, however, involve a number of drawbacks and none of them are satisfactory in commercial application. For example, according to the method (1), rheological flow properties of the resin can be improved, whereby it is possible to control resin temperature conditions optimum for melt-flow viscosity suitable for expansion. However, the temperature control range can be improved only to a small extent and besides there is no improvement of retentivity of gases such as blowing agents at all. Thus, this method fails to give substantial improvement in the art. That is, even if expansion may proceed as intended, the resultant expanded product will suffer from immediate shrinkage to be converted directly to expanded products with high density. Alternatively, even if the once shrinked expanded product may have a change to be expanded again by the air impregnated thereinto, the creases, concavo-convex deformations on the surface or cracks on cell walls formed at the time of shrinkage cannot thereby be remedied. In consequence, no excellent expanded product can be obtained. For the same reason as mentioned above in connection with the method (1), the method (2) cannot be free from the same drawback. In addition it further involves the drawback that the desirable characteristics inherent in a polyolefin resin may be impaired. The method (3), especially that as disclosed by Japanese published examined patent application No. 4341/1960, is now accepted as the most excellent method and has been practically used for commercial production of thick expanded articles. But this method cannot also be free from the problem of shrinkage or concavo-convex deformations on the surface of the expanded products. Furthermore, the specific blowing agents to be employed in this method are too expensive to be economical. Lastly, the partial esters used in the method (4) have insufficient effect of preventing shrinkage or cannot sufficiently be kneaded with the resin, whereby expansion moldability is lowered.

An object of the present invention is to provide a resin composition which can readily be formed into an expanded product with good quality from a synthetic resin which itself is difficultly formed into an expanded product with good quality due to excessive shrinkage phenomenon, particularly a polyolefin resin composition suitable for preparation of expanded products having a bulk density of 10 to 200 kg/m$^3$ and smooth surface, and being excellent in closed cellular structure as well as in compressive strength.

Another object of the present invention is to provide a novel expanded product of a polyolefin resin having specific characteristics of an expanded product which cannot be obtained by any of prior art methods.

Still another object of the present invention is to provide a process for expansion of a thermoplastic resin which is capable of supplying economically expanded articles with low density, high closed cell percentage having excellent surface smoothness and compressive strength by preventing shrinkage in volume of the expanded products with lapse of time.

According to the present invention, there is provided a thermoplastic resin composition for manufacturing expanded products, comprising a thermoplastic synthetic resin and at least one compound selected from the group consisting of the compounds represented by the formulas (I), (II) and (III) as set forth below contained in said resin in an amount of 0.1 to 10% by weight based on the weight of said resin:

wherein $R_1$ is an alkyl group having 10 to 24 carbon atoms, X and X' each hydrogen atom, an alkyl group having 1 to 24 carbon atoms which may be substituted or a substituent containing a group of the formula —(R$_4$O)$_m$— wherein $R_4$ is an alkylene group having 1 to 5 carbon atoms and m an integer of 1 to 10;

wherein $R_2$ is an alkyl group having 9 23 carbon atoms, Y and Y' each hydrogen atom, an alkyl having 1 to 24 carbon atoms, an acyl having 10 to 24 carbon atoms or a substituent containing a group of the formula —(R$_4$O)$_m$— wherein $R_4$ is an alkylene group having 1 to 5 carbon atoms and m an integer of 1 to 10;

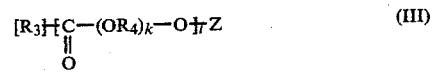

wherein [R$_3$] means plural alkyl or hydroxyalkyl groups corresponding in number to the integer l, which may be the same or different, each having 9 to 23 carbon atoms, $R_4$ an alkylene group having 1 to 5 carbon atoms, k an integer of 0 to 7, l an integer of 2 to 8 and Z a 1-valent residue of l-valent polyhydric alcohol from which 1 hydroxyl groups are eliminated.

The expanded product obtained by using the composition of the present invention as mentioned above is also novel when a polyolefin resin is used as the thermoplastic resin. Thus, the present invention also provides an expanded article of a polyolefin resin, comprising an expanded product of a polyolefin resin containing at least one compound selected from the group consisting of the compounds represented by the formulas (I), (II) and (III) as mentioned above in an amount of 0.1 to 10% by weight based on said resin and having closed cellular characteristic value of 0 to 0.5 g/cm$^3$, a bulk density of 10 to 200 kg/m$^3$ and a compressive strength coefficient of $2.15 \times 10^{-3}$ to $2.89 \times 10^{-2}$.

Figure 2:
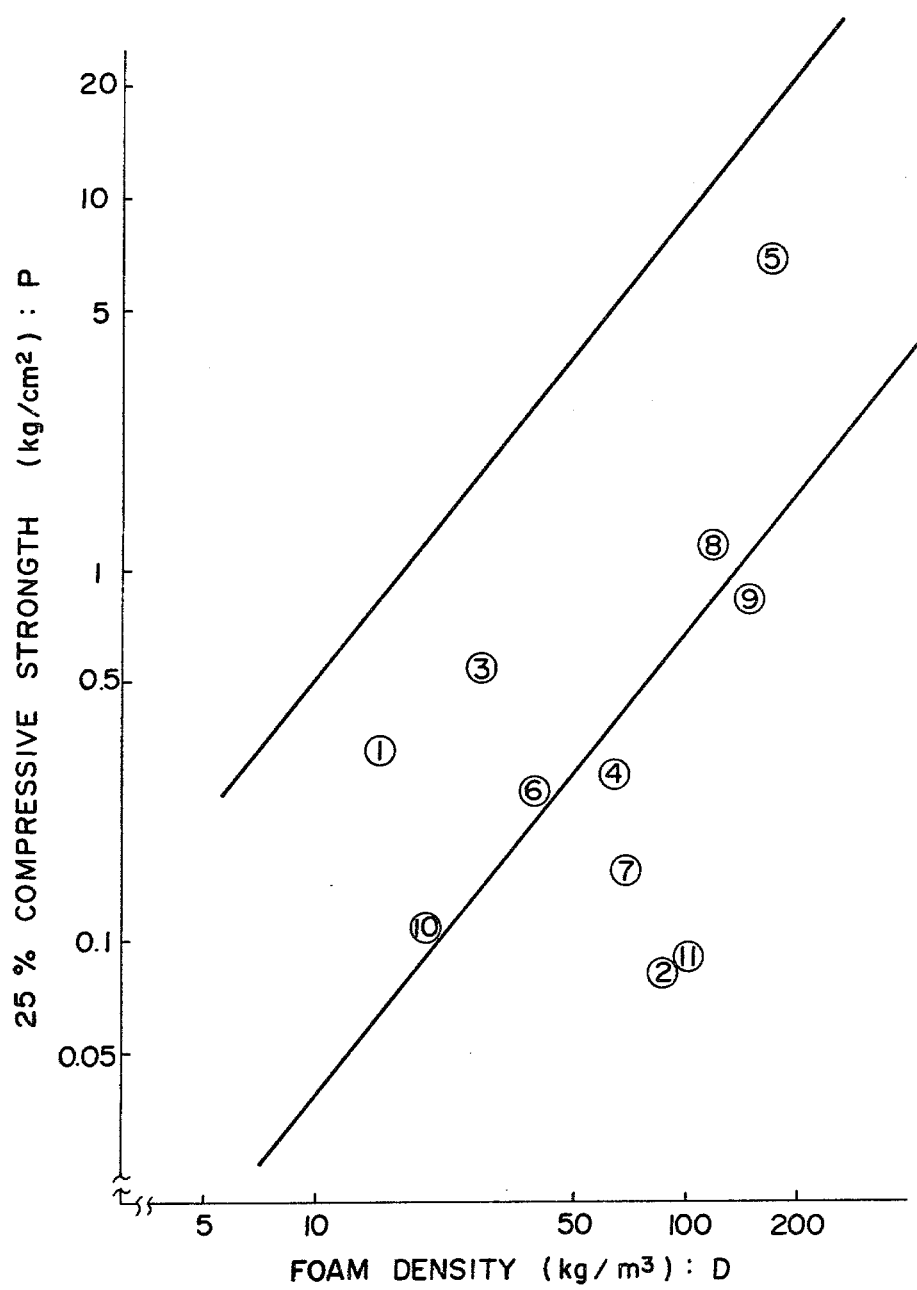
Figure 3:
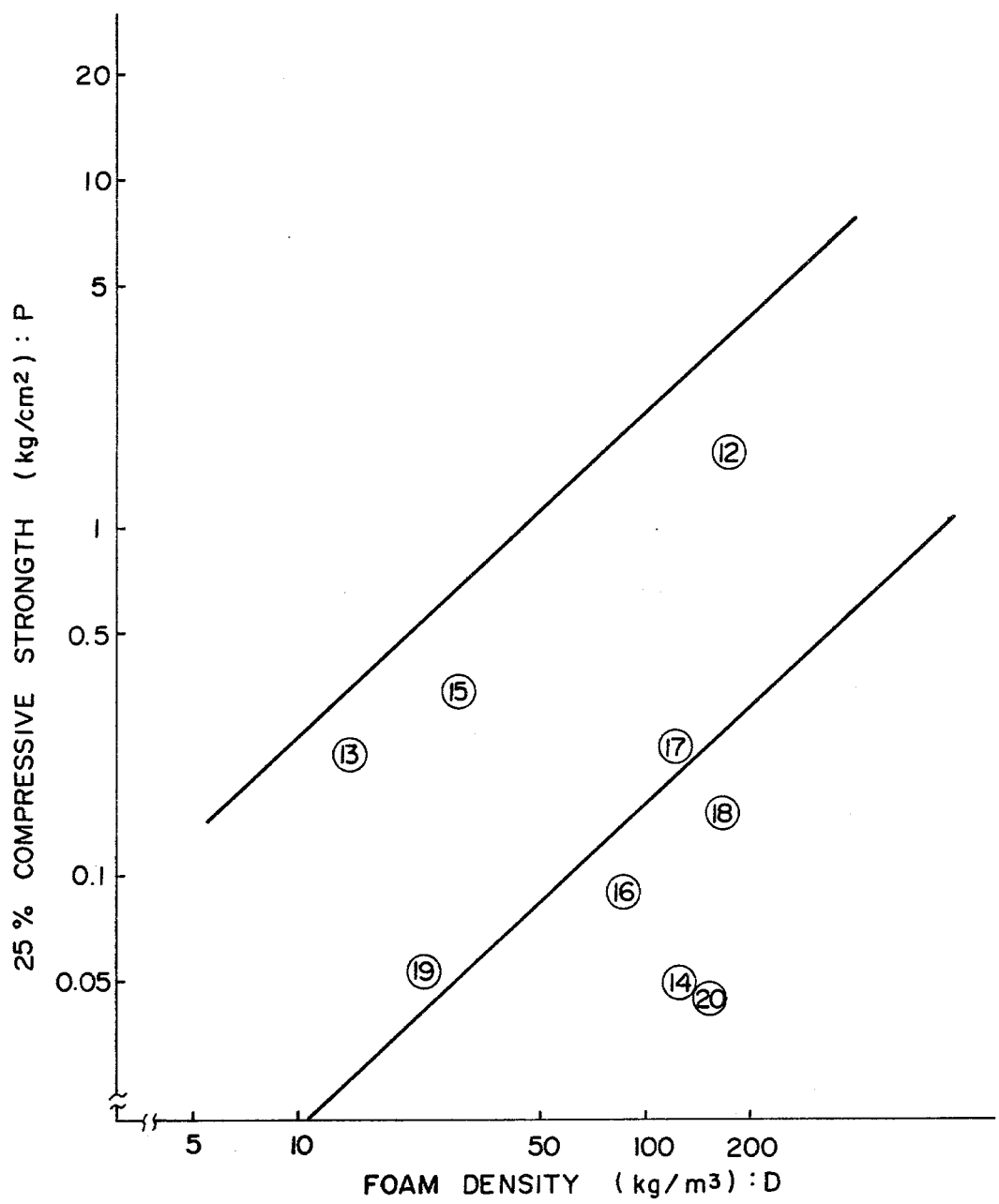
Figure 4:
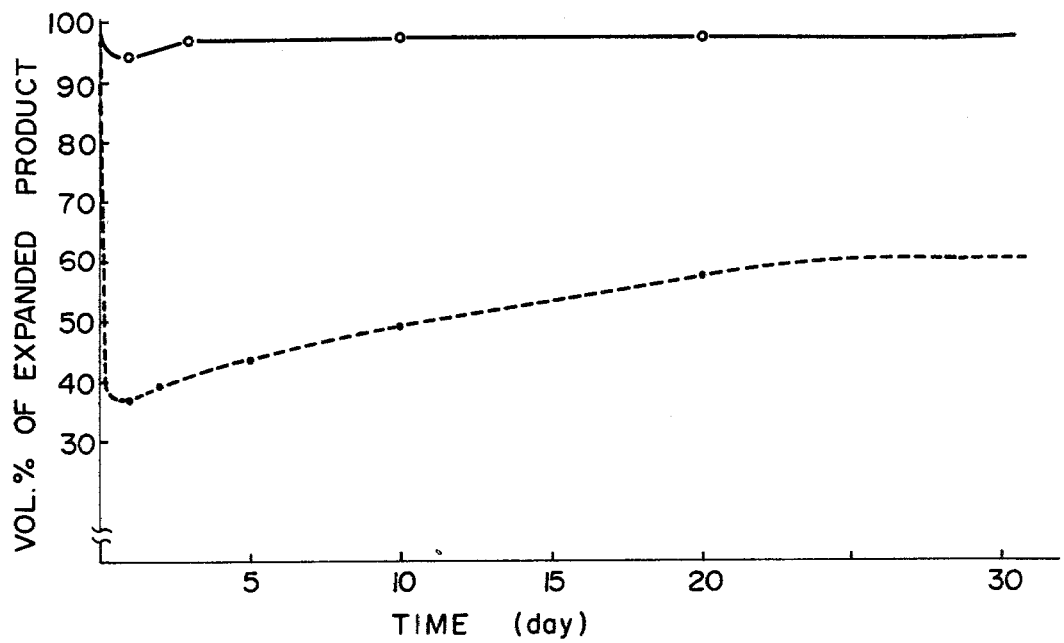
Figure 5:
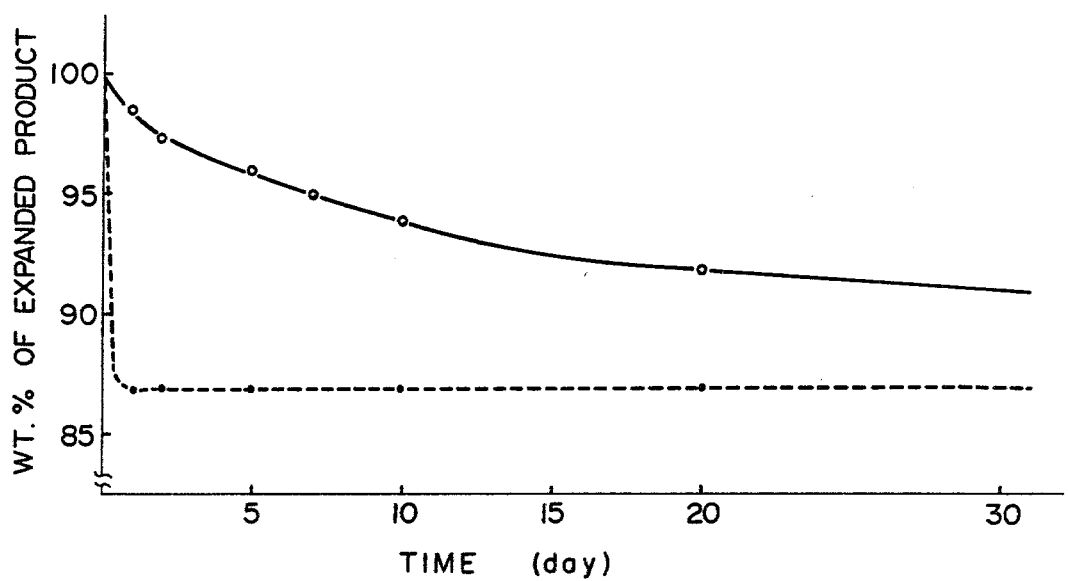

In the accompanying drawings:

FIG. 1 shows the relationship of the volume change (ordinate) of the expanded product of the present invention (obtained in Experiment I) with lapse of time (abscissa) in which the marks ⊕, ○, △, ▲ and ⊙ correspond to Sample No. 1 to No. 5, respectively;

FIG. 2 compressive strength (at 25% compression) of several expanded products of polyethylene resin containing the additives according to the present invention and of polyethylene containing no additive plotted as ordinate versus bulk density of said products as abscissa;

FIG. 3 compressive strength (at 25% compression) of several expanded products of ethylene-vinyl acetate copolymer resin containing the additive and also of the same resin containing no additive plotted as ordinate versus bulk density of said products as abscissa (In FIG. 2 and FIG. 3 the two straight lines in the drawings correspond to critical values $2.15 \times 10^{-3}$ and $2.89 \times 10^{-2}$, respectively);

FIG. 4 the change in volume percentage (ordinate) of expanded products (obtained in Example 10 and Comparison example 1) based on the volumes immediately after expansion with lapse of time (abscissa); and FIG. 5 the change in weight percentage (ordinate) of expanded products (obtained in Example 10 and Comparison example 1) based on the weight immediately after expansion with lapse of time. (In FIG. 4 and FIG. 5 the marks ○ and ⊙ correspond to Example 10 and Comparison example 1, respectively).

The specific feature of the present invention resides in use of at least one compound selected from the three classes of the compound (I), (II) and (III) as mentioned above.

The first class of the compounds are higher alkyl amines and N-substituted derivatives thereof as represented by the above specified formula (I). The alkyl group represented by $R_1$ is required to have 10 to 24 carbon atoms, preferably 12 to 22 carbon atoms. It may either be straight chain, branched or alicyclic. But for the practical reason from economical standpoint such as commercial availability or cost, a straight chain alkyl having 12 to 22 carbon atoms may preferably be used. The alkyl amines (I) to be used in the present invention are inclusive of primary, secondary and tertiary amines. Thus, both of X and X' may be hydrogen atom, or one or both of them may be substituents.

Preferable examples of substituents are as follows:

(a) an alkyl having 1 to 24 carbon atoms
(b) $-(CH_2)_n-NH_2$ (n is an integer of 1 to 22)
(c) $-(CH_2)_n-N-H$ (R$_5$ is an alkyl having 1 to 24 carbon atoms)
    $\quad\quad\quad\quad\;\;|$
    $\quad\quad\quad\quad R_5$

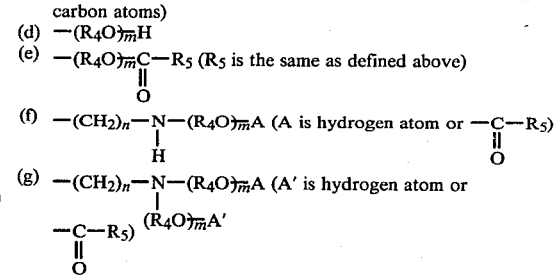

(d) $-(R_4O)_{\overline{m}}H$
(e) $-(R_4O)_{\overline{m}}\overset{\|}{\underset{O}{C}}-R_5$ (R$_5$ is the same as defined above)
(f) $-(CH_2)_n-N-(R_4O)_{\overline{m}}A$ (A is hydrogen atom or $-\overset{\|}{\underset{O}{C}}-R_5$)
    $\quad\quad\quad\quad\;\;|$
    $\quad\quad\quad\quad H$
(g) $-(CH_2)_n-N-(R_4O)_{\overline{m}}A'$ (A' is hydrogen atom or
    $\quad\quad\quad\quad\;\;|$
    $\quad\quad\quad-\overset{\|}{\underset{O}{C}}-R_5$) $(R_4O)_{\overline{m}}A'$ As preferable combinations of X and X', when one of X and X' is the group (a), the other is the group (b) or (c); when one of X and X' is hydrogen atom or the group (d) or (e), the other is hydrogen atom or any of the groups (a) to (g).

Typical examples of the compounds according to the formula (I) may include dodecyl amine, tetradecyl amine, hexadecyl amine, octadecyl amine, eicosyl amine, docosyl amine, N-methyl dodecyl amine, N-methyl octadecyl amine, N-ethyl octadecyl amine, dodecyl propylene diamine, tetradecyl propylene diamine, hexadecyl propylene diamine, octadecyl propylene diamine, N-methyl hexadecyl propylene diamine, N,N'-dimethyl hexadecyl propylene diamine, N-methyl octadecyl propylene diamine, N,N'-dimethyl octadecyl propylene diamine, hexadecyl ethylene diamine, octadecyl ethylene diamine, N-methyl hexadecyl ethylene diamine, N-methyl octadecyl ethylene diamine, and the like. Typical examples of the saturated higher aliphatic amine derivatives are polyoxyethylene myristyl amine, polyoxyethylene palmityl amine, polyoxyethylene stearyl amine, polyoxypropylene palmityl amine, polyoxypropylene stearyl amine, miristyl amine acetate, palmityl amine acetate, stearyl amine acetate, polyoxyethylene lauryl amine mono(and di-)palmitate, polyoxyethylene lauryl amine mono(and di-)stearate, and polyoxyethylene palmityl amine mono(and di-)palmitate, polyoxyethylene palmityl amine mono(and di-)stearate, polyoxyethylene stearyl amine mono (and di-)palmitate, polyoxyethylene stearyl amine mono(and di-)stearate, N-methyl polyoxyethylene stearyl amine palmitate, N-ethyl polyoxyethylene stearyl amine stearate, lauryl mono (and di-)ethanolamine palmitate, lauryl mono(and di-)ethanolamine stearate, palmityl mono(and di-)ethanolamine palmitate, palmityl mono(and di-)ethanolamine stearate, stearyl mono (and di-)ethanolamine palmitate, stearyl mono(and di-)ethanolamine stearate, dodecyl propylene diamine oxyethylene addition product, hexadecyl propylene diamine oxyethylene addition product, octadecyl propylene diamine oxyethylene addition product, polyoxyethylene hexadecyl propylene diamine mono(and di-)palmitate, polyoxyethylene hexadecyl propylene diamine mono(and di-)stearate, polyoxyethylene octadecyl propylene diamine mono(and di-)palmitate, polyoxyethylene octadecyl propylene diamine mono(and di-)stearate, and the like.

The second class of the compounds are saturated fatty acid amides and derivatives thereof as represented by the formula (II) as specified above. The alkyl group $R_2$ in the formula (II) is required to have 9 to 23 carbon atoms, preferably 11 to 21 atoms, and may be either straight chain, branched or cyclic. For the same practical reason as mentioned above in connection with $R_1$, R$_2$ may preferably a straight chain alkyl having 11 to 21 carbon atoms. Similarly, each of Y and Y' may either be hydrogen atom or a substituent. As substituents, there may be mentioned as alkyl having 1 to 24 carbon atoms, an acyl having 10 24 carbon atoms or a group of the formula —(R$_4$O)$_m$A$_2$ (wherein m is an integer of 1 to 10 and A$_2$ hydrogen atom, an alkyl having 1 to 24 carbon atoms or an acyl having 10 to 24 carbon atoms).

Typical examples of the compounds (II) are lauric acid amide, myristic acid amide, palmitic acid amide, stearic acid amide, arachic acid amide (eicosyl amide), behenic acid amide (docosyl amide), N-methyl stearic acid amide, N,N'-dimethyl stearic acid amide, di-lauric acid amide, di-palmitic acid amide, di-stearic acid amide, tri-lauric acid amide, tri-palmitic acid amide, tri-stearic acid amide, and so on. The saturated higher fatty acid amide derivatives may include lauric acid mono-(and di-)ethanolamide, myristic acid mono(and di-)ethanolamide, palmitic acid mono(and di-)ethanolamide, stearic acid mono(and di-)ethanolamide, arachic acid mono(and di- )ethanolamide, behenic acid mono-(and di-)ethanolamide, lignoceric acid mono(and di-)ethanolamide, lauric acid mono-isopropanolamide, palmitic acid mono-isopropanolamide, stearic acid mono-isopropanolamide, polyoxyethylene lauric acid amide, polyoxyethylene myristic acid amide, polyoxyethylene palmitic acid amide, polyoxyethylene stearic acid amide, polyoxyethylene arachic acid amide, di-lauric acid mono-ethanolamide, di-myristic acid mono-ethanolamide, di-palmitic acid mono-ethanolamide, di-stearic acid mono-ethanolamide, di-arachic acid mono-ethanolamide, polyoxyethylene di-stearic acid amide, polyoxyethylene lauric acid amide.mono-stearate, polyoxyethylene stearic acid amide.mono-stearate, etc.

The third group of the compounds are complete esters of saturated higher fatty acids as represented by the formula (III) as specified above. They are complete esters of polyhydric alcohols of the formula Z(OH)$_i$ and saturated fatty acids having 10 to 24 carbon atoms. In the above formula, the symbol [R$_3$] means plural alkyl groups comprehensively, each being attached to each ester linkage which is bonded to polyhydric alcohol residue represented by Z, and each having 9 to 23 carbon atoms. Also in this compound, straight chain alkyl having 11 to 21 carbon atoms is preferred. The complete esters may be modified by addition reaction to include polyoxyalkylene group of the formula —(OR$_4$-)$_k$— in the molecule. The oxyalkylene group —OR$_4$— may preferably oxyethylene or oxypropylene.

Typical examples of the compounds (III) are polyoxyethylene di-myristate, polyoxypropylene di-myristate, polyoxyethylene di-palmitate, polyoxypropylene di-palmitate, polyoxyethylene di-stearate, polyoxypropylene di-stearate, polyoxyethylene di-arachate, polyoxyethylene di-behenate, ethyleneglycol di-myristate, ethyleneglycol di-palmitate, ethyleneglycol di-stearate, ethyleneglycol di-arachate, ethyleneglycol di-behenate, lauric acid tri-glyceride, myristic acid tri-glyceride, palmitic acid tri-glyceride, stearic acid tri-glyceride, arachic acid tri-glyceride, 1,3-palmito-2-stearic acid glyceride, 1,3-stearo-2-myristic acid glyceride, sorbitane tetra-palmitate, sorbitane tetra-stearate, 12-hydroxy stearic acid tri-glyceride, sorbitane tetra-12-hydroxystearate, mono-stearic acid-di-12-hydroxy-stearic acid tri-glyceride, polyoxyethylene glycerine tristearate, polyoxyethylene glycerine tri-12-hydroxystearate, polyoxyethylene sorbitane tetra-stearate, polyoxyethylene sorbitane tetra-12-hydroxystearate, monostearic acid-di-12-hydroxy stearic acid polyoxyethylene tri-glyceride, and the like.

It is critically required in the present invention that at least one compound selected from the group of the compounds (I), (II) and (III) as described above should be contained in the thermoplastic synthetic resin in a total amount of 0.1 to 10% by weight based on the weight of said resin.

Referring now to Experiments I to IV set forth below, the specific behavior of the compounds within the scope of the present invention when they are contained in an amount within the range as specified above is to be described.

EXPERIMENT I

Using an ethylene-vinyl acetate copolymer (EVA-TATE D-2021, trade mark, produced by Sumitomo Chemical Co., Ltd.; vinyl acetate content: 10 wt. %, density: 0.93, Melt Flow Index: 1.5) as base resin, various samples are prepared by adding the compounds as shown in Table 1 and each sample is fabricated into a non-stretched sheet with thickness of about 0.15 mm.

Table 1

| Sample No. | Additives | | | |
|---|---|---|---|---|
| | Trade name | Principal component | Parts per 100 parts of resin (by weight) | Manufacturer |
| 1 | Amine A . B | Octadecyl amine | 2 | Nippon Oils & Fats Co., Ltd. |
| 2 | Fatty acid amide T | Stearic acid amide/ palmitic acid amide | 2 | Kao Soap Co., Ltd. |
| 3 | Hardened oil | Stearic acid tri-glyceride | 5 | Kao Soap Co., Ltd. |
| 4 | Span 85 (reference) | Sorbitane tri-oleate | 2 | Kao Soap Co., Ltd. |
| 5 | -(Control) | — | — | — |

The gas permeability characteristics of these sheets are measured according to the following method:

Device: Gas-permeability measuring instrument (LYSSY-L100-3001 model, produced by LYSSY Co.)

Gases to be permeated: Air; Dichlorotetrafluoroethane (blowing agent)

Method: Gas permeability coefficient is determined by measuring the time (seconds) needed until the inner pressure of a vessel initially maintained at 0.2 Torr at about 30° C. is increased to 0.4 Torr by the gas permeated through the sample sheet. The time is measured repeatedly until its value becomes approximately constant, and the average value of three measured values is divided by the thickness of the sheet to give the gas permeability coefficient.

The results of measurement are given in the following Table 2.

Table 2

| | Sample No. | | | | |
|---|---|---|---|---|---|
| | 1 | 2 | 3 | 4 | 5 |
| | Additive | | | | |
| Permeated gas | Amine AB | Fatty acid amide T | Hardened oil | Span 85 (reference) | Control |
| 1,2- | | | | | |

Table 2-continued

| | Sample No. | | | | |
|---|---|---|---|---|---|
| | 1 | 2 | 3 | 4 | 5 |
| | | | Additive | | |
| Permeated gas | Amine AB | Fatty acid amide T | Hardened oil | Span 85 (reference) | Control |
| dichloro-tetra-fluoro ethane | 244 | 255 | 320 | 121 | 79 |
| Air | 340 | 350 | 380 | 490 | 320 |
| | | | | | unit: sec/mm |

As apparently seen from Table 2, the compositions according to the present invention (Sample Nos. 1, 2 and 3) suppress noticeably permeability of blowing agent gas as compared with Control (Sample No. 5), while they suppress little permeability of the air. On the contrary, the composition of the reference (Sample No. 4) slightly suppresses permeability of the blowing agent gas, while it greatly suppresses permeability of the air.

Based on the presumption that the well-balanced permeabilities of the air and the blowing agent gas through the resin compositions of the present invention as shown in Table 2 might be reflected in expansion procedure to result in ideal expanded products, the present inventors have made experiments to apply these compositions for manufacturing expanded products of polyethylene and ethylene-vinyl acetate copolymer resin in spite of the fact that expansion molding of polyethylene resin under uncrosslinked state has been deemed to be difficult and also that expansion molding with high closed cell percentage of ethylene-vinyl acetate copolymer resin has been substantially impossible.

The following Experiments II–IV illustrates the results of these experiments.

EXPERIMENT II

Each of the resin compositions according to Sample Nos. 1 to 5 as described in Experiment 1 is mixed with 0.1 part by weight of calcium stearate and 0.6 part by weight of calcium stearate and fed to an extruder (30 mmφ). The mixture is kneaded internally of the extruder together with 28 parts by weight of 1,2-dichlorotetrafluoroethane and the thus mixed resin is extruded into the air while being maintained at about 90° C. to effect expansion to obtain expanded products.

The density of the expanded products obtained is controlled to be 36 to 37 kg/m³.

The volume of the resultant expanded product is thereafter continued to be measured day by day. On the other hand, for the expanded product after 10 days, there are conducted measurements of compressive strength, compression permanent set, compression creep, surface smoothness, maximum shrinkage of the expanded product after expansion, dimensional stability of the expanded product and closed cellular characteristic value (each measurement method is hereinafter described).

FIG. 1 shows the relationship of the volume change with lapse of time and Table 3 the results of the measurement of various characteristics for each expanded product.

The compressive strength coefficient is also determined from the formula (2) as hereinafter described and shown in Table 3 in bracket together with 25% compressive strength (according to JIS-K-6767), since the latter varies depending on the density of the expanded product, etc.

As is clear from the above results, the composition of the present invention can be expanded using a blowing agent to give feasibly expanded products with good quality of uncrosslinked polyethylene which has hitherto been deemed to be difficult in the prior art as well as expanded products with good quality of ethylene-vinyl acetate copolymer resin which cannot practically be prepared in the prior art.

Table 3

Characteristics of expanded products (measured after 10 days after expansion)

| Sample No. | Density [kg/m³] Immediately after expansion | Density [kg/m³] After 10 days | Compressive strength kg/cm² (coefficient) | Permanent set at 50% compression (%) | Compressive creep (%) | Surface smoothness (number/cm) | Maximum foam shrinkage after expansion (Vol. %) | Dimensional stability of foam (%) | Closed cellular characteristic value (g/cm³) |
|---|---|---|---|---|---|---|---|---|---|
| 1 | 36 | 34 | 1.48 ($2.82 \times 10^{-2}$) | 10 | 6 | 0 | 8.0 | 3 | 0.0008 |
| 2 | 36 | 34 | 1.46 ($2.80 \times 10^{-2}$) | 11 | 6 | 0 | 5.5 | 5 | 0.0012 |
| 3 | 36 | 34 | 1.47 ($2.81 \times 10^{-2}$) | 11 | 6 | 0 | 7.5 | 7 | 0.0024 |
| 4 | 37 | 64 | 0.10 ($9.3 \times 10^{-4}$) | 28 | 24 | 14 | 51 | 8 | 0.0135 |
| 5 | 37 | 51 | 0.11 ($1.35 \times 10^{-3}$) | 24 | 21 | 12 | 35 | 19 | 0.0114 |

The concept of compressive strength coefficient is herein introduced to specify the novel expanded articles obtained by use of the composition according to the present invention. This is because apparent compressive strength as shown in Table 3 varies depending on bulk density of the expanded product and therefore it is not desirable to characterize the expanded product in terms of such an apparent compressive strength. As the result of numerous experiments, the present inventors were successful in generalization of the compressive strength relative to bulk density according to the following formula:

$$P = A \times D^{1.248} \cdot Y \qquad (1)$$

From the formula (1) is obtained:

$$A = P/D^{1.248} \cdot Y \qquad (2)$$

wherein A represents compressive strength coefficient, P 25% compressive strength measured according to JIS-K-6767, D bulk density of expanded product, the value 1.248 is the index experimentally determined from numerous data, Y is parameter $(1-\alpha/100)$, $\alpha$ being percentage (wt.) of the component to be copolymerized in the resin (for example, vinyl acetate in ethylene-vinyl acetate copolymer). This specific compressive strength coefficient is hereinafter referred to as "A value".

EXPERIMENT III

Using a low density polyethylene (Asahi-Dow Polyethylene F-1920, trade mark, produced by Asahi-Dow Limited; density: 0.919, Melt Flow Index 2.0) as base resin, the compositions 1 to 11 containing the additives and blowing agents as shown in Table 4, respectively, per 100 parts by weight of said resin are prepared by kneading similarly in an extruder and subjected to extrusion expansion as in Experiment II. As nucleators, there are employed 0.06 parts by weight of calcium stearate and 0.36 parts by weight of calcium silicate in each composition. After 10 days after formation of expanded product, 25% compressive strength is measured according to JIS-K-6767 for each expanded product from each composition to give the results as shown in FIG. 2, the numbers in FIG. 2 corresponding to those of the compositions.

EXPERIMENT IV

Using an ethylene-vinyl acetate copolymer (EVA-TATE K-2010, trade mark, produced by Sumitomo Chemical Co., Ltd.; vinyl acetate content 25 wt. %, density: 0.95, Melt Flow Index: 3.0) as base resin, 0.1 part of calcium stearate and 0.6 part by weight of calcium silicate as nucleators and the additives and blowing agents as shown in Table 5, under otherwise the same conditions as in Experiment III, the compositions 12 to 20 are formed into expanded products. The results of measurement conducted similarly as in Experiment III are shown in FIG. 3, wherein the numbers correspond to those of the compositions.

Table 4

| Composition No. | Blowing agent (wt.parts) | Additive (wt.parts) |
|---|---|---|
| 1 | Dichlorodifluoromethane (57) | Fatty acid amide T(4.0) |
| 2 | Dichlorodifluoromethane (57) | None |
| 3 | Dichlorodifluoromethane (22) | Fatty acid amide T(2.0) |
| 4 | Dichlorodifluoromethane (22) | None |
| 5 | Dichlorodifluoromethane (5) | Amine AB (1.0) |
| 6 | Butane (8) | Hardened oil (3.0) |
| 7 | Butane (8) | None |
| 8 | Butane (6) | Fatty acid amide T(0.5) |
| 9 | Butane (6) | None |
| 10 | 1-chloro-1,1-difluoro-ethane (60) | Hardened oil (2.0) |
| 11 | 1-chloro-1,1-difluoro-ethane (60) | None |

Table 5

| Composition No. | Blowing agent (wt.parts) | Additive (wt.parts) |
|---|---|---|
| 12 | 1,2-dichloro-tetrafluoro ethane (10) | Amine AB (1.0) |
| 13 | Dichlorodifluoromethane (57) | Fatty acid amide T(5.0) |
| 14 | Dichlorodifluoromethane (57) | None |
| 15 | Dichlorodifluoromethane (22) | Fatty acid amide T(4.0) |
| 16 | Dichlorodifluoromethane (22) | None |
| 17 | Butane (7) | Hardened oil (2.0) |
| 18 | Butane (7) | None |
| 19 | 1-chloro-1,1-difluoro-ethane (60) | Hardened oil (3.0) |
| 20 | 1-chloro-1,1-difluoro-ethane (60) | None |

As apparently seen from FIG. 2 and FIG. 3, the A values of the expanded products obtained by use of the compositions of the present invention are invariably within $2.15 \times 10^{-3}$ to $2.89 \times 10^{-2}$ even when the blowing agent employed may be varied. In contrast, the A values of the expanded products using no composition of the present invention are by far smaller than the range as specified above. While being not bound by any theory, this is probably due to the following reason. Blowing agent gases contained in the expanded products are rapidly dissipated therefrom at the stage immediately after expansion in case when no composition of the present invention is employed, while the air penetrates into the expanded product considerably slowly. Consequently, at the stage before complete solidification of the resin while it is hot, the expanded product is brought internally to a state under reduced pressure, whereby it is compressed by atmospheric pressure to be shrinked. Thus, cooling is completed while giving deformations or cracks on cell walls. When the penetration of the air is slower than the cooling speed as mentioned above, the expanded product is cooled as it is to result in an expanded product with high density and having a large number of permanent creases remained on the expanded product. Even when the air may be penetrated more rapidly, simultaneously with reduction in pressure in the expanded product, to effect surface expansion of the expanded product, the deformations or cracks already formed on cell walls will prevent such surface expansion to make restoration to original volume difficult. This speculation is considered to be quite probable because the A values of the expanded products are greatly deteriorated.

Whereas, in the expanded product prepared from the composition of the present invention, the resin can be solidified with very small extent of shrinkage by permitting blowing agent gases to be replaced by the air while maintaining the ratio of both gases permeated suitably. As the result, the expanded product can be free from deformations or cracks on the cell walls to exhibit not only the excellent compressive strength coefficient but also excellent surface smoothness.

If the specific compound of the present invention is used in less than 0.1 wt. % based on the resin, no significant effect can be otained. On the contrary, an amount in excess of 10 wt. % does not necessarily lead to improvement of the effect but in some cases may cause an adverse effect on the rheological flow properties of the composition itself. Accordingly, the amount of the specific compound added is generally selected from about 0.5 to 7 wt. % from economical standpoint. There is no significant change in the amount of the compound added when it is in the composition or when it is in the expanded product, and it is calculated as a total amount of the specific compounds employed based on the weight of the resin.

For the purpose of the invention, there may be employed either a single compound or a combination of two or more compounds selected from those as mentioned above. The compound may be incorporated in the resin by any method but it is desirable to contain the compound in the resin so that said compound may be dispersed as homogeneously as possible in the resin when the composition is formed into an expanded product.

In accordance with the present invention, there is also provided a process for expanding a thermoplastic synthetic resin, which comprises incorporating at least one compound selected from the group consisting of the compounds of the formulas (I), (II) and (III) as described above in the thermoplastic synthetic resin in an amount of 0.1 to 10% by weight based on said resin together with a suitable amount of a blowing agent under the condition maintained at a temperature in the range from about 15° to 300° C. to form an expandable resin composition and then allowing said resin composition to expand utilizing the expanding force of the blowing agent contained therein.

In the process as specified above, the compounds may be incorporated in the resin by so called impregnation method wherein a substance to be incorporated is contacted with resin particles and said substance is impregnated into the resin by controlling the pressure and the temperature. Alternatively, there may also be employed so called kneading method wherein the resin and the substance to be incorporated are subjected to mixing and kneading. Furthermore, a combination of both methods may also be applicable. The substances to be incorporated may either be simultaneous or stepwise. These operations may be conducted under well known conditions, namely at a temperature in the range from 15° to 300° C. and a pressure of 0.05 to 300 kg/cm$^2$ (gauge).

The expanding force of blowing agent used in this process is obtained through phase transfer (from liquid phase to gas phase), volume expansion of blowing agent and decomposition of blowing agent (from solid to gas), and therefore the conditions are determined depending on the blowing agent employed and expanding operations. For example, when a physical blowing agent is used in extrusion expansion, a resin kneaded for temperature adjustment at a temperature of about 60° to 280° C. under a pressure of 5 to 200 kg/cm$^2$ can be extruded into the atmosphere at a temperature of about 20° C. and under pressure of 1 atm. to obtain sufficient expanding force. Alternatively, when a physical blowing agent is used in cavity expansion, a resin containing a blowing agent is filled in a cavity and the cavity is heated under conditions at a temperature of about 115° C. under pressure of 0.23 kg/cm$^2$ (gauge).

The specific feature of the process according to the present invention resides in allowing a thermoplastic synthetic resin composition containing 0.1 to 10 wt. % of at least one compound as specified by the formulas (I), (II) and (III) to expand with a blowing agent which is also contained in said resin. This is because, in the absence of the specific compound, the expanded product suffers from shrinkage in the course of preparation and with lapse of time, as explained with reference to FIGS. 1 to 3 and Table 3, thereby giving only expanded products with high density, having much concavo-convex deformations or creases or being very low in closed cell percentage. In particular, no expanded product with excellent compressive strength can be obtained in the absence of the specific compound.

Similarly as described in connection with the composition of the present invention, an amount of the specific compound less than 0.1 wt. % fails to give the effect of the invention, while an amount exceeding 10 wt. % may cause adverse effect rather than better results. The specific compounds may also be used either singly or in a mixture of two or more compounds. The preferable total amount of the specific compounds falls also within 0.5 to 7 wt %. They can be contained in the resin in any conventional manner, but it is desirable to disperse the compounds as homogeneously as possible throughout the entire resin.

As blowing agents to be used in the present invention, volatile organic blowing agents and thermally decomposable gas-releasing chemical blowing agents are available. Preferably, there may be employed volatile organic blowing agents having boiling point (at 1 atm.) not higher than melting point of the base resin, such as trichlorofluoromethane, dichlorodifluoromethane, dichlorofluoromethane, chlorodifluoromethane, 1,1′,2-trichlorotrifluoroethane, 1,2-dichlorotetrafluoroethane, 1-chlorotrifluoroethane, 1-chloro-1,1′-difluoroethane, 1,1′-difluoroethane, octafluorodichlorobutane, propane, butane, butene, propylene, pentane, etc. When the base resin to be expanded is a non-crosslinked polyolefin resin, it is preferred to select a volatile blowing agent from those as enumerated above having a Kauri-Butanol value in the range of 10 to 25 as determined by the method according to ASTM-D-1133-61.

These blowing agents may be employed generally in an amount in the range from 5 to 70% by weight based on the resin depending on the desired density of expanded products.

The process of the present invention is expected to be most advantageously be applied in the field of so called continuous extrusion expansion. In this case, for example, the base resin, the specific compound and blowing agent are fed into an extruder heated at a temperature higher than melting point of the base resin (generally about 120° to 280° C.), kneaded under a pressure generally of about 50 to 300 kg/cm$^2$ therein, then said mixture is adjusted to a temperature suitable for expansion in the range from the melting point of the base resin to the temperature lower by 50° C. than the melting point (generally about 60° to 200° C.) before being extruded through an orifice to the outside at about 25° C. under atmospheric pressure, thereby accomplishing expansion simultaneously with extrusion, followed by cooling to produce expanded articles. This technique is economical in continuous expansion of a large amount of resins. In particular, by use of the specific compound of the present invention, it is rendered possible to select a blowing agent from a large number of less expensive compounds which have hitherto been insufficient in expandability when used alone as blowing agents. To speak one typical example, in place of an expensive blowing agent 1,2-dichlorotetrafluoroethane, there can be employed less expensive blowing agents such as dichlorodifluoromethane, propane or butane to a great economical advantage.

The thermoplastic synthetic resin to be used in the present invention refer to all polymers, copolymers and mixed polymers which can be subjected to melt fabrication. In particular, thermoplastic synthetic resins which can be improved in expandability by addition of the specific compound of the present invention are those which will undergo shrinkage when expanded due to the greater ratio S'/S exceeding 1 of permeating speed (S') of volatile hydrocarbon or fluorocarbon gas through said resin film to that (S) of the air (at the time of expansion as estimated by FIG. 4 and FIG. 5). More specifically, they may include crosslinked or non-crosslinked polyolefin resins such as ethylene homopolymers (e.g. high density polyethylene, medium density polyethylene or low density polyethylene or a mixture thereof), ethylenic copolymers having ethylene content of 50% or more (e.g. ethylene-vinyl acetate copolymer, ethylene-acrylic acid ester copolymer, ethylene-methacrylic acid ester copolymer, a metallic salt of an ethylene-acrylic acid copolymer, ethylene-propylene copolymer, ethylene-vinyl chloride copolymer), polypropylene and polybutene-1. Among them, polyethylene resin and ethylene-vinyl acetate copolymer are preferably used. The polyolefin resin to be employed in the present invention may have a melt index which is not specifically limited but generally within the range from 0.3 to 45. When it is desired to employ a crosslinked polyolefin resin, it may be prepared by conventional method by effecting crosslinking using a crosslinking agent such as organic peroxides or irradiation of electron beam.

The resin composition of the present invention may further contain, if desired, other inorganic or organic additives such as pigments, fire-retardants, lubricants, anti-oxidants, UV-absorbers, nucleators, anti-static agents or others in an amount of preferably no more than 3% by weight based on the weight of the resin. In particular, it is preferably to use a small amount (not more than 1% by weight) of nucleators such as talc or a fatty acid metal salt in order to control uniformly the cell distribution in the resultant expanded product.

The present invention is further illustrated with reference to the following Examples and Comparison Examples. The measurement of characteristic values and evaluation of these values herein mentioned are conducted by the methods and the criteria, respectively, as set forth below.

1. Compressive strength and compressive strength coefficient
    (a) 25% compressive strength (P):
        Compressive strength at the time of 25% compression is measured according to JIS-K-6767.
    (b) compressive strength coefficient (A):
        This value is calculated by the formula (2) as mentioned above from the above compressive strength (P) and bulk density (D) of expanded product.
2. 50% compression permanent set:
    According to JIS-K-6767 (at the time of 50% compression).
3. Compression creep:
    According to JIS-K-6767 (under area load of 0.1 Kg/cm$^2$·24 hour)
4. Surface smoothness:
    The surface of expanded product is measured over 10 cm length by coarseness measuring instrument to detect creases or concavo-convexes with width of 0.5 mm or more and the number detected is calculated per 1 cm length.
5. Feeding characteristic through extruder:
    Change in amount extruded per one minute when performing extrusion by 30 mm$\phi$ extruder is expressed by variance percentage (n=15).

$$\text{Variance percentage} = \frac{\text{Maximum amount} - \text{minimum amount}}{\text{Average amount}} \times 100$$

6. Maximum shrinkage:
    Volume of expanded product is measured (by water-sink method) every day for 20 days after expansion and maximum shrinkage is calculated by the following formula:

$$\text{Maximum shrinkage} = 1 - \frac{\text{Volume of expanded product on the day when it is minimum}}{\text{Volume of expanded product immediately after expansion}} \times 100$$

7. Dimensional stability:
    From the result of measurement 6. as mentioned above, dimensional stability is calculated by the following formula:

$$\text{Dimensional stability} = \frac{|V_0 - V_{20}|}{V_0} \times 100$$

(wherein $V_0$ is volume of expanded product immediately after expansion and $V_{20}$ that after 20 days.)

8. Closed cellular characteristic value:
    In water in a vessel having water volume sufficient to sink sample in water and a function to be sealed is sunk an expanded product sample of 15 mm×15 mm×100 mm (volume: V; weight: $W_0$) to be held therein, followed by sealing of the vessel. Subsequently, the inner pressure in the vessel is reduced to 460 mm Hg and left to stand for 10 minutes. Then, the inner pressure in the vessel is restored to atmospheric and the sample is taken out. The sample is calmly dipped in pure methanol for about 2 seconds, followed by wipe-off of the moisture adhered on the surface, dried in a drier at 60° C. for 5 minutes and thereafter its weight ($W_1$) is measured. Closed cellular characteristic value is calculated by the following formula:

$$\text{Closed cellular characteristic value (g/cm}^3\text{)} = \frac{W_1 - W_0}{V}$$

9. Criteria for evaluation:
    Each evaluation item is rated according to the ranks as shown in the following Table:

| | Ranks | | | |
|---|---|---|---|---|
| Evaluation item | a (excellent) | b (good) | c (passable) | d (bad) |
| 1. Compressive strength coefficient | $8.0 \times 10^{-3}$ or more | $4.0 \times 10^{-3}$ or more, less than $8.0 \times 10^{-3}$ | $2.15 \times 10^{-3}$ or more, less than $4.0 \times 10^{-3}$ | less than $2.15 \times 10^{-3}$ |

-continued

| | | Ranks | | |
|---|---|---|---|---|
| Evaluation item | a (excellent) | b (good) | c (passable) | d (bad) |
| 2. 50% compression permanent set (%) | less than 5 to 0 | 5 or more, less than 15 | 15 or more, less than 30 | 30 or more |
| 3. Compressive creep (%) | less than 5 to 0 | 5 or more, less than 10 | 10 or more less than 20 | 20 or more |
| 4. Surface smoothness (number/cm) | less than 3 to 0 | 3 or more, less than 6 | 6 or more, less than 10 | 10 or more |
| 5. Feeding characteristic of extruder (%) | less than 5 to 0 | 5 or more, less than 10 | 10 or more, less than 15 | 15 or more |
| 6. Maximum shrinkage (%) | less than 10 to 0 | 10 or more, less than 15 | 15 or more, less than 20 | 20 or more |
| 7. Dimensional stability (%) | less than 5 to 0 | 5 or more, less than 10 | 10 or more, less than 15 | 15 or more |
| 8. Closed cellular characteristic (g/cm$^3$) | less than 0.010 to 0 | 0.010 or more, less than 0.025 | 0.025 or more, less than 0.50 | 0.50 or more |

Overall evaluation is rated from the ranks as set forth above according to the following ranks:

| | |
|---|---|
| a (excellent) | when there are at least two excellent marks with no bad or passable mark |
| b (good) | when there is at least one good mark with no bad mark and not more than two passable marks |
| c (passable) | when there are three or more passable marks with no bad mark |
| d (bad) | when there is one or more bad mark |

The details of the thermoplastic synthetic resins and the specific compounds employed in the following Examples and Comparison Examples are listed below.

Thermoplastic resins:

Resin A: low density polyethylene produced by Asahi-Dow Limited, F-1920, trade mark, density: 0.919 g/cc, MI: 2.0 g/10 min.

Resin B: ethylene-vinyl acetate copolymer produced by Sumitomo Chemical Co., Ltd., EVATATE D-2021, trade mark, vinyl acetate content: 10 wt. %, density: 0.93 g/cc, MI: 1.5 g/10 min.

Resin C: ethylene-vinyl acetate copolymer produced by Sumitomo Chemical Co., Ltd., EVATATE K-2010, trade mark, vinyl acetate content: 25 wt. %, density: 0.95 g/cc, MI: 3.0 g/10 min.

Additives (Nos. 1–18: specific compounds of the invention; Nos. 19–31: reference compounds)

| No. | Trade name of additives | Manufacturer | Name of the compounds |
|---|---|---|---|
| 1 | Fatty acid amide T | Kao Soap Co., Ltd. | Stearic acid amide and palmitic acid amide (mixture) |
| 2 | Amine BB | Nippon Oils & Fats Co., Ltd. | Dodecyl amine |
| 3 | Amine AB | Nippon Oils & Fats Co., Ltd. | Octadecyl amine |
| 4 | N-methyl-octadecyl amine | Nippon Oils & Fats Co., Ltd. | N-methyloctadecyl amine |
| 5 | Asfazol #20 | Nippon Oils & Fats Co., Ltd. | Stearyl propylene diamine |
| 6 | Naimine S-202 | Kao Soap Co., Ltd. | Polyoxyethylene octadecyl amine (2 moles of oxyethylene added) |
| 7 | Naimine S-210 | Kao Soap Co., Ltd. | Polyoxyethylene octadecyl amine (10 moles of oxyethylene added) |
| 8 | Denon 331 P | Marubishi Petrochemical Co. | Polyoxyethylene stearyl amine mono- and di-stearate (mixture) |
| 9 | Esoduomine T-13 | Lion Fat & Oil Co., Ltd. | Polyoxyethylene stearyl and palmityl diamine (mixture: 3 moles of oxyethylene added) |
| 10 | Resicoat 1936 | Lion Fat & | Oxyethylene stearyl and |

| No. | Trade name of additives | Manufacturer | Name of the compounds |
|---|---|---|---|
| | | Oil Co., Ltd. | palmityl diamine (mixture: one mole of oxyethylene added) |
| 11 | Fatty acid amide C | Kao Soap Co., Ltd. | Lauric acid amide |
| 12 | Amizol SDE | Kawaken Fine Chemical Co., Ltd. | 1:1-type stearic acid diethanolamide |
| 13 | Amizol SME | Kawaken Fine Chemical Co., Ltd. | 1:1-type stearic acid mono-ethanolamide |
| 14 | Amizol LME | Kawaken Fine Chemical Co., Ltd. | 1:1-type lauric acid mono-ethanolamide |
| 15 | Fatty acid amide P | Kao Soap Co., Ltd. | Palmitic acid amide |
| 16 | Hardened oil | Kao Soap Co., Ltd. | Stearic acid triglyceride |
| 17 | Kao wax 85 powder | Kao Soap Co., Ltd. | 12-hydroxy stearic acid triglyceride |
| 18 | Unister-E-275 | Nippon Oils & Fats Co., Ltd. | Ethyleneglycol distearate |
| 19 | Syntolex L-100 | Nippon Oils & Fats Co., Ltd. | Sodium lauryl sulfate |
| 20 | Atmos-150 | Kao Soap Co., Ltd. | Stearic acid mono- and di-glyceride |
| 21 | Cation $S_2$-100 | Nippon Oils & Fats Co., Ltd. | Octadecyl dimethylbenzyl ammonium chloride |
| 22 | Noion SN-204.5 | Nippon Oils & Fats Co., Ltd. | Polyoxyethylene nonyl phenol ether |
| 23 | Caproic acid amide | Kanto Chemical Co., Ltd. | Caproic acid amide |
| 24 | Span 85 | Kao Soap Co., Ltd. | Sorbitane trioleate |
| 25 | Triphenyl carbinol | Kanto Chemical Co., Ltd. | Triphenyl carbinol |
| 26 | 1,2-diphenyl ethylene- diamine | Kanto Chemical Co., Ltd. | 1,2-diphenyl ethylene- diamine |
| 27 | Phthalamide | Kanto Chemical Co., Ltd. | Phthalamide |
| 28 | Lunac S-30 | Kao Soap Co., Ltd. | Stearic acid |
| 29 | Zinc stearate | Sakai Chemical Co., Ltd. | Zinc stearate |
| 30 | Fatty acid amide 0 | Kao Soap Co., Ltd. | Oleic acid amide |
| 31 | Alfro P-10 | Nippon Oils & Fats Co., Ltd. | Erucic amide |

EXAMPLES 1–18 AND COMPARISON EXAMPLES 1–14

To 100 parts by weight of Resin B are added various additives as shown in Table 6, 0.1 part by weight of calcium stearate, 0.6 part by weight of calcium silicate and 22 parts by weight of a volatile blowing agent dichlorodifluormethane. Each mixture is kneaded by means of a 30 mm single screw extruder equipped with a round orifice of 5 mm in diameter and heated at 190° C. By adjusting the resin temperature in the orifice at 90° C., extrusion expansion is carried out for each mixture to prepare an expanded product thereof. These expanded products are subjected to evaluation test as described above to give the results as shown in Table 6. Table 6 clearly shows that the expanded products of Examples 1 to 18 containing the compounds of the formulas (I) to (III) exhibit superior values to those of Comparison example 1 containing no additive and Comparison examples 2 to 14 containing other compounds than those of the formulas (I) to (III).

The volumes and weights of the expanded products obtained in Example 10 and Comparison example 1 are continued to be measured every day for about one month, respectively, and the percentages of volumes and the weights based on those immediately after expansion are plotted versus lapse of time (days) in FIG. 4 and FIG. 5.

As apparently seen from FIG. 4 and FIG. 5, the expanded product of Example 10 is reduced in weight with lapse of time, while its volume is not reduced with small shrinkage and good restorability. In contrast, the expanded product of Comparison example 1 suffers from abrupt and noticeable shrinkage with reduction in weight and its volume restored with lapse of time is at most about 60%.

Table 6

Base resin: B, 100 wt. parts
Nucleators: Calcium stearate 0.1 wt. part, calcium silicate 0.6 wt. part
Blowing agent: Dichlorodifluoromethane 22 wt. parts Evaluation Table 6-continued Base resin: B, 100 wt. parts
Nucleators: Calcium stearate 0.1 wt. part, calcium silicate 0.6 wt. part
Blowing agent: Dichlorodifluoromethane 22 wt. parts

| Example | Additives Type of compounds | Additives Trade name (wt. parts) | Density (10 days after expansion) g/cm³ | Compressive strength coefficient | 50% compression permanent set | Compression creep | Surface smoothness | Feeding characteristic through extruder | Maximum shrinkage | Dimensional stability | Closed cellular characteristic value | Overall evaluation |
|---|---|---|---|---|---|---|---|---|---|---|---|---|
| 1 |  | Amine BB (2.0) | 0.029 | a | b | b | a | a | a | a | a | a |
| 2 |  | Amine AB (2.0) | " | a | b | b | a | a | a | a | a | a |
| 3 | Saturated higher aliphatic amine compounds | N-methyl-octadecyl amine (2.0) | 0.030 | a | b | b | a | a | a | a | a | a |
| 4 |  | Asfazol #20 (2.0) | " | a | b | b | a | b | a | a | a | a |
| 5 |  | Naimine S-202 (2.0) | 0.029 | a | b | b | b | b | b | a | a | a |
| 6 |  | Naimine S-210 (2.0) | " | a | b | b | b | b | b | a | a | a |
| 7 |  | Denon 331P (5.0) | 0.030 | a | b | b | b | b | b | a | a | a |
| 8 |  | Esoduomine F13 (3.0) | " | a | b | b | a | b | a | a | a | a |
| 9 |  | Resicoat 1936 (3.0) | " | a | b | b | a | b | a | a | a | a |
| 10 |  | Fatty acid amide T (1.0) | 0.029 | a | b | b | a | a | a | a | a | a |
| 11 | Saturated higher fatty acid amides | Fatty acid amide C (3.0) | " | a | b | b | a | a | a | a | a | a |
| 12 |  | Amizol SDE (2.0) | " | a | b | b | a | a | a | a | a | a |
| 13 |  | Amizol SME (2.0) | 0.030 | a | b | b | a | a | a | a | a | a |
| 14 |  | Amizol LME (2.0) | " | a | b | b | a | a | a | a | a | a |
| 15 |  | Fatty acid amide P (2.0) | 0.029 | a | b | b | a | a | a | a | a | a |
| 16 | Complete esters of saturated higher fatty acids | Hardened oil (1.5) | " | a | b | b | a | b | a | a | a | a |
| 17 |  | Kao wax 85 powder (1.5) | " | a | b | b | a | b | a | a | a | a |
| 18 |  | Unister E275 (1.5) | 0.030 | a | b | b | b | b | b | a | a | a |

| Comparison example | Additive trade name (wt. parts) | Density (10 days after expansion) g/cm³ | Compressive strength coefficient | 50% compression permanent set | Compression creep | Surface smoothness | Feeding characteristic through extruder | Maximum shrinkage | Dimensional stability | Closed cellular characteristic value | Overall evaluation |
|---|---|---|---|---|---|---|---|---|---|---|---|
| 1 | None | 0.075 | d | d | d | d | a | d | d | b | d |
| 2 | Atmos 150 (1.5) | " | c | c | c | d | d | c | d | b | d |
| 3 | Syntolex L-100 (2.0) | " | d | d | d | d | b | d | d | b | d |
| 4 | Cation S₂-100 (2.0) | 0.073 | d | d | d | d | b | d | d | b | d |
| 5 | Nonion NS 204.5 (2.0) | 0.072 | d | d | d | d | d | d | d | b | d |
| 6 | Capronamide (2.0) | " | d | d | d | d | a | d | d | b | d |
| 7 | Fatty acid amide O (2.0) | 0.074 | d | d | d | d | b | d | d | b | d |
| 8 | Alfro P-10 (2.0) | 0.074 | d | d | d | d | b | d | d | b | d |
| 9 | Span 85 (2.0) | " | d | d | d | d | d | d | d | b | d |
| 10 | Triphenyl carbinol (2.0) | " | d | d | d | d | b | d | d | b | d |
| 11 | 1,2-Diphenyl ethylene-diamine (2.0) | 0.073 | d | d | d | d | b | d | d | b | d |
| 12 | Phthalamide (2.0) | 0.075 | d | d | d | d | b | d | d | b | d |
| 13 | Lunac S-30 |  |  |  |  |  |  |  |  |  |  |

Table 6-continued

Base resin: B, 100 wt. parts
Nucleators: Calcium stearate 0.1 wt. part, calcium silicate 0.6 wt. part
Blowing agent: Dichlorodifluoromethane 22 wt. parts

| | | | | | | | | | | | |
|---|---|---|---|---|---|---|---|---|---|---|---|
| | (2.0) | " | d | d | d | d | b | d | d | b | d |
| 14 | Zinc stearate 2.0 | " | d | d | d | d | b | d | d | b | d | examples 15 to 17 when various blowing agents D, E and F are employed.

Table 7

Base resin: A 100 wt. parts
Nucleators: Calcium stearate 0.06 wt. parts, calcium silicate 0.36 wt. parts
Blowing agents: D: Dichlorodifluoromethane 22 wt. parts
E: 1-chloro-1,1-difluoroethane 20 wt. parts
F: Butane 8 wt. parts

| Example | Additives (wt. parts) Type of compounds | Trade name | Blowing agent | Density (10 days after expansion) g/cm³ | Compressive strength coefficient | 50% compression permanent set | Compression creep | Surface smoothness | Feeding characteristic through extruder | Maximum shrinkage | Dimensional stability | Closed cellular characteristic value | Overall evaluation |
|---|---|---|---|---|---|---|---|---|---|---|---|---|---|
| 19 | Saturated | Amine AB (1.0) | D | 0.030 | a | a | a | a | a | a | a | a | a |
| 20 | higher aliphatic amines | Amine AB (3.0) | E | 0.032 | a | b | b | b | a | b | a | a | a |
| 21 | | Amine AB (7.0) | F | 0.034 | a | b | b | b | b | b | a | a | a |
| 22 | Saturated higher fatty acid amides | Fatty acid amide T (0.3) | D | 0.030 | a | a | a | a | a | a | a | a | a |
| 23 | | Fatty acid amide T (2.0) | E | 0.032 | a | b | a | a | a | b | a | a | a |
| 24 | | Fatty acid amide T (5.0) | F | 0.033 | a | b | b | b | b | b | a | a | a |
| 25 | Complete esters of saturated higher fatty acids | Hardened oil (4.0) | D | 0.030 | a | a | a | a | b | a | a | a | a |
| 26 | | Hardened oil (6.0) | E | 0.033 | a | b | b | b | b | b | a | a | a |
| 27 | | Hardened oil (10.0) | F | 0.034 | a | b | b | b | b | b | a | a | a |

| Comparison example | Additives | Blowing agent | Density (10 days after expansion) g/cm³ | Compressive strength coefficient | 50% compression permanent set | Compression creep | Surface smoothness | Feeding characteristic through extruder | Maximum shrinkage | Dimensional stability | Closed cellular characteristic value | Overall evaluation |
|---|---|---|---|---|---|---|---|---|---|---|---|---|
| 15 | None | D | 0.063 | d | d | d | d | a | d | d | b | d |
| 16 | None | E | 0.062 | d | d | d | d | a | d | d | b | d |
| 17 | None | F | 0.069 | d | d | d | d | a | d | d | b | d |

EXAMPLES 19–27 AND COMPARISON EXAMPLES 15–17

Expanded products are prepared similarly as described in Examples 1–18 except that 100 parts by weight of Resin A are used as base resin, 0.06 parts by weight of calcium stearate and 0.36 part by weight of calcium silicate powders as nucleators and the blowing agents D, E and F as shown in Table 7 in amounts of 22, 20 and 8 parts by weight, respectively, and that the resin temperature in the orifice is controlled at 104° C. From the results shown in Table 7, it is clearly seen that Examples 19 to 27 give better results than Comparison

EXAMPLES 28–36 AND COMPARISON EXAMPLES 18–21

Using 100 parts by weight of Resin C as base resin, blowing agents D, E, G and H as shown in Table 8 in amounts of 22, 20, 28 and 26 parts by weight, respectively, and the additives as shown in Table 8 in amounts indicated therein, and also adjusting the resin temperature in the orifice at 78° C., under otherwise the same conditions as described in Examples 1 to 18, various expanded products are prepared. The results are shown in Table 5, which clearly shows that Examples 28 to 36 give better results than Comparison examples 18 to 21 even when there is employed Resin C of an ethylene-vinyl acetate copolymer with higher vinyl acetate content from which a volatile blowing agent is liable to be readily escaped.

amounts and the amounts of dichlorodifluoromethane as shown in Table 9, various expanded products are prepared. The results as shown in Table 9 indicate that the products of Examples 37–39 are better in expansion moldability and physical properties of the resultant Table 8

Base resin: C 100 wt. parts
Nucleators: Calcium stearate 0.1 wt. part, calcium silicate 0.6 wt. part
Blowing agents: D: dichlorodifluoromethane 22 wt. parts
E: 1-chloro-1,1-difluorethane 20 parts
G: 1,2-dichlorotetrafluoroethane 28 wt. parts
H: 1,2-dichlorotetrafluoroethane/mono-chloropentafluoroethane = 75/25 (wt. ratio) 26 wt. parts

| Example | Additives (wt. parts) Type of compounds | Additives (wt. parts) Trade name | Blowing agents | Density (10 days after expansion) g/cm³ | Compressive strength coefficient | 50% compression permanent set | Compression creep | Surface smoothness | Feeding characteristic through extruder | Maximum shrinkage | Dimensional stability | Closed cellular characteristic value | Overall evaluation |
|---|---|---|---|---|---|---|---|---|---|---|---|---|---|
| 28 | Saturated higher aliphatic amine | Amine AB (3.0) | D | 0.031 | a | b | b | a | a | a | a | a | a |
| 29 | | Amine AB (5.0) | E | 0.033 | a | b | b | a | b | a | a | b | a |
| 30 | | Amine AB (2.0) | G | 0.037 | a | b | b | a | a | a | a | a | a |
| 31 | Saturated higher fatty acid amine | Fatty acid amide T (2.0) | D | 0.030 | a | b | b | a | a | a | a | a | a |
| 32 | | Fatty acid amide T (3.0) | E | 0.032 | a | b | b | a | a | a | a | a | a |
| 33 | | Fatty acid amide T (1.0) | G | 0.038 | a | b | b | a | a | a | a | a | a |
| 34 | Complete ester of saturated higher fatty acid | Hardened oil (5.0) | D | 0.030 | b | b | b | a | b | a | a | a | a |
| 35 | | Hardened oil (8.0) | E | 0.033 | b | b | b | a | b | a | a | b | a |
| 36 | | Hardened oil (3.0) | G | 0.038 | b | b | b | a | b | a | a | a | a |

| Comparison example | Additives | Blowing agent | Density (10 days after expansion) g/cm³ | Compressive strength coefficient | 50% compression permanent set | Compression creep | Surface smoothness | Feeding characteristic through extruder | Maximum shrinkage | Dimensional stability | Closed cellular characteristic value | Overall evaluation |
|---|---|---|---|---|---|---|---|---|---|---|---|---|
| 18 | None | D | 0.084 | d | d | d | d | a | d | d | b | d |
| 19 | None | E | 0.084 | d | d | d | d | a | d | d | b | d |
| 20 | None | G | 0.064 | d | d | d | d | a | d | d | b | d |
| 21 | None | H | 0.032 | c | c | c | b | a | b | b | d | d |

EXAMPLES 37–39 AND COMPARISON EXAMPLES 22–24

According to the same procedure as in Examples 1–18 except for the specific compounds and their expanded products than those of the Comparative examples even when the amounts of the blowing agent are greatly changed as shown in Table 9.

Table 9

Resin: B 100 wt. parts
Nucleators: Calcium stearate 0.1 wt. part, calcium silicate 0.6 wt. part
Blowing agent: Dichlorodifluoromethane

| Amount blowing | Density (10 days after expansion) | Compressive strength coefficient | 50% compression permanent set | Compression | Surface | Feeding characteristic | Maximum | Dimensional | Closed cellular char- | Overall |

Table 9-continued

Resin: B 100 wt. parts
Nucleators: Calcium stearate 0.1 wt. part, calcium silicate 0.6 wt. part
Blowing agent: Dichlorodifluoromethane

| | Additives trade name (wt. parts) | agent (wt. parts) | pan-sion) g/cm³ | co-effi-cient | ma-nent set | pres-sion creep | face smooth-ness | through ex-truder | mum shrink-age | sta-bili-ty | acter-istic value | eva-lua-tion |
|---|---|---|---|---|---|---|---|---|---|---|---|---|
| Example 37 | Fatty acid amide T (4) | 60 | 0.014 | a | b | b | a | b | a | a | b | a |
| 38 | Fatty acid amide T (2) | 9 | 0.077 | a | b | b | a | a | a | a | a | a |
| 39 | Fatty acid amide T (1) | 5 | 0.174 | a | a | a | a | a | a | a | a | a |
| Comparison example 22 | | 60 | 0.080 | d | d | d | d | a | d | a | b | d |
| 23 | | 9 | 0.089 | c | c | d | d | a | d | b | b | d |
| 24 | | 5 | 0.195 | b | c | c | c | a | d | c | d | d |

EXAMPLE 40

In polyethylene resin (F-2130, trade mark, produced by Asahi-Dow Limited, density: 0.921 g/cc, MI: 3.0 g/10 min.), there are added by kneading 0.45% by weight of dicumyl peroxide as crosslinking agent and 1.5% by weight of stearic acid amide (Fatty acid amide T, trade mark, produced by Kao Soap Co., Ltd.) and the mixture is subjected to crosslinking reaction. The resultant crosslinked polyethylene resin particles (spherical with diameter of 1.5 mm) with gel content of 61% are impregnated in an autoclave with dichlorodifluoromethane under pressurization with heating and thereafter cooled. The expandable crosslinked polyethylene resin particles thus obtained are found to contain 14 wt. % of dichlorodifluoromethane. These particles are placed in a pressure-type expanding vessel wherein they are allowed to expand while passing steam of 0.23 Kg/cm²·G for 45 seconds to obtain primarily expanded particles with density of 100 Kg/m³. Subsequently, these primarily expanded particles are placed in an autoclave and, under pressurization with the air at 10 Kg/cm²·G, heat treatment is conducted at 80° C. for 15 hours to increase inner pressure in the cells, followed by passing of steam of 0.32 Kg/cm² to effect expansion to obtain secondarily expanded particles with density of 27 Kg/m³. After increasing the inner pressure in the cells of these secondarily expanded particles, they are filled under compression in a cavity in a molding machine (ECHO-120 model, produced by Toyo Machinery & Metal Co., Ltd.) and subjected to expansion fusion molding by heating with steam of 1.1 Kg/cm²·G. The density of the molded expanded product is found to be 25 Kg/m³ and have a closed cellular characteristic value of less than 0.01.

COMPARISON EXAMPLE 25

Example 40 is repeated except that no stearic acid amide is added. The resultant primarily expanded particles are found to have a density of 111 Kg/m³, while the secondarily expanded articles a density of 31 Kg/m³. The expanded particles have higher density as compared with those of Example 40 and said particles are found to have relatively large number of creases. When the secondarily expanded particles are molded similarly as in Example 40, the expanded product obtained is found to have a density of 30 Kg/m³. It is also inferior in closed cell percentage and compressive strength to that of Example 40. The life of beads impregnated with blowing agent for retaining desirable expandability is also shorter by one hour as compared with those of Example 40.

EXAMPLE 41

Using a mixed resin comprising 60 parts by weight of a high density polyethylene (Suntec S-360, trade mark, produced by Asahi Kasei Kogyo Kabushiki Kaisha, density: 0.950 g/cc) and 40 parts by weight of an ionomer (Surlyn A 1706, trade mark, produced by E. I. du Pont de Nemours, Inc.), 1.5 parts by weight of stearic acid amide as specific additive (Fatty acid amide T, trade mark, produced by Kao Soap Co., Ltd.), 0.3 part by weight of calcium silicate powders as nucleators and 27 parts by weight of dichlorodifluoromethane as volatile blowing agent are kneaded with said mixed resin in a 30 mm single screw extruder equipped with an orifice with diameter of 5 mm and heated at 220° C. While adjusting the resin temperature in the orifice at 122° C., extrusion expansion is conducted to obtain expanded product having excellent characteristics such as closed cellular characteristic of 0.005 g/cm³, density of 23 Kg/m³, compressive strength coefficient of $2.01 \times 10^{-2}$ and maximum expansion shrinkage of 0.2%.

EXAMPLE 42

Example 41 is repeated except that the base resin of high density polyethylene is replaced by isotactic polypropylene (Chisso Polypro 1011, trade mark, produced by Chisso Corporation) and the resin temperature in the orifice is adjusted at 135° C. The expanded product obtained is found to have excellent characteristics such as closed cellular characteristic. Of 0.008 g/cm³, density of 21 Kg/m³, compressive strength coefficient of $2.10 \times 10^{-2}$ and maximum expansion shrinkage of 0.1%.

What we claim is:

1. An expanded article of an olefin polymer comprising an expanded product of an olefin polymer containing at least one compound, which imports little shrinkage to said expanded article after expansion selected from the group consisting of the compounds represented by the formulas (I), (II) and (III) as set forth below in an amount of 0.1 to 10% by weight based on the weight of said resin and having a closed cellular characteristic value of 0 to 0.5 g/cm³, a bulk density of 10 to 200 kg/m³ and a compressive strength coefficient of $2.15 \times 10^{-3}$ to $2.89 \times 10^{-2}$:

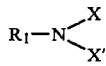 (I)

wherein $R_1$ is an alkyl group having 10 to 24 carbon atoms, X and X' each hydrogen atom, an alkyl group having 1 to 24 carbon atoms which may be substituted or a substituent selected from the group consisting of —$(CH_2)_n NH_2$ wherein n is an integer of 1 to 22,

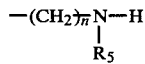

wherein $R_5$ is an alkyl having 1 to 24 carbon atoms, —$(R_4O)_m H$ wherein $R_4$ is an alkylene group having 1 to 5 carbon atoms and m an integer of 1 to 10,

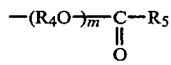

wherein $R_5$ is an alkyl having 1 to 24 carbon atoms,

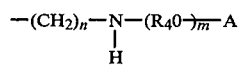

wherein n is an integer of 1 to 22 and A is hydrogen atom or

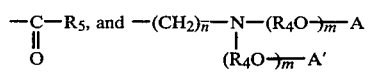

wherein A' is hydrogen atom or

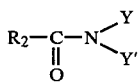 (II)

wherein $R_2$ is an alkyl group having 9 to 23 carbon atoms, Y and Y' each hydrogen atom, an alkyl having 1 to 24 carbon atoms, an acyl having 10 to 24 carbon atoms or a substituent of the formula —$(R_4O)_m A_2$ wherein $A_2$ is hydrogen atom, an alkyl having 1 to 24 carbon atoms or acyl having 10 to 24 carbon atoms;

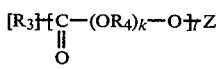 (III)

wherein means plural alkyl or hydroxyalkyl groups corresponding in number to the integer l, which may be the same or different, each having 9 to 23 carbon atoms, $R_4$ an alkylene group having 1 to 5 carbon atoms, k an integer of 0 to 7, l an integer of 2 to 8 and Z a l-valent residue of l-valent polyhydric alcohol from which l hydroxyl groups are eliminated.

2. An expanded article according to claim 1, wherein the polyolefin resin is a olefin polymer or an ethylenevinyl acetate copolymer resin.

3. A process for expanding an olefin polymer, which comprises incorporating at least one compound, which imparts little shrinkage to said expanded polymer after expansion, selected from the group consisting of the compounds of the formulas (I), (II) and (III) as set forth below in a thermoplastic synthetic resin in an amount of 0.1 to 10% by weight based on the weight of said resin together with a blowing agent under the condition maintained at a temperature in the range from about 15° to 300° C. to form an expandable resin composition and then allowing said resin composition to expand utilizing the expanding force of the blowing agent contained therein:

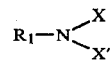 (I)

wherein $R_1$ is an alkyl group having 10 to 24 carbon atoms, X and X' each hydrogen atom, an alkyl group having 1 to 24 carbon atoms which may be substituted or a substituent selected from the group consisting of —$(CH_2)_n NH_2$ wherein n is an integer of 1 to 22,

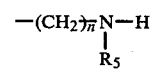

wherein $R_5$ is an alkyl having 1 to 24 carbon atoms, —$(R_4O)_m H$ wherein $R_4$ is an alkylene group having 1 to 5 carbon atoms and m is an integer of 1 to 10,

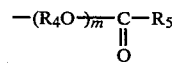

wherein $R_5$ is an alkyl having 1 to 24 carbon atoms,

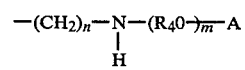

wherein n is an integer of 1 to 22 and A is hydrogen atom or

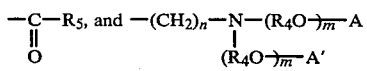

wherein A' is hydrogen atom or

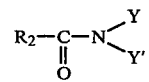 (II)

wherein $R_2$ is an alkyl group having 9 to 23 carbon atoms, Y and Y' each hydrogen atom, an alkyl having 1 to 24 carbon atoms, an acyl having 10 to 24 carbon atoms or a substituent of the formula —$(R_4O)_m A_2$ wherein $A_2$ is hydrogen atom, an alkyl having 1 to 24 carbon atoms or acyl having 10 to 24 carbon atoms;

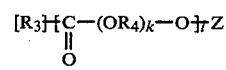 (III)

wherein means plural alkyl or hydroxyalkyl groups corresponding in number to the integer l, which may be the same or different, each having 9 to 23 carbon atoms, $R_4$ an aklylene group having 1 to 5 carbon atoms, k an integer of 0 to 7, l an integer of 2 to 8 and Z a l-valent residue of l-valent polyhydric alcohol from which l hydroxyl groups are eliminated.

4. A process according to claim 3, wherein the olefin polymer is cross-linked.

5. A process according to claim 3, wherein the olefin polymer is a polyethylene resin, an ethylene-vinyl acetate copolymer resin, or a polypropylene resin.

6. A process according to any of claims 3 to 5, wherein the polymer composition is expanded by extrusion foaming by means of an extruder.

* * * * *

UNITED STATES PATENT AND TRADEMARK OFFICE
CERTIFICATE OF CORRECTION

PATENT NO. : 4,214,054          Page 1 of 3
DATED : July 22, 1980
INVENTOR(S) : Seizaburo Watanabe and Yutaka Matsuki It is certified that error appears in the above-identified patent and that said Letters Patent are hereby corrected as shown below:

Title page, last line of Abstract, "higher" should read -- high --;

Column 1, line 52, "change" should read -- chance --;

Column 2, line 53, "9 23" should read -- 9 to 23 --;

Column 2, lines 65 and 68, "1" should read -- ℓ --;

Columns 2, 27 and 28, Formula III should read as follows:

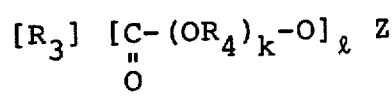

$$[R_3] \ [\underset{\underset{O}{\|}}{C}-(OR_4)_k-O]_\ell \ Z$$

Column 3, line 1, "1-valent" and "1" should read -- ℓ-valent -- and -- ℓ --;

Column 3, line 47, "compound" should read -- compounds --;

Column 4, line 40, delete "and" before "polyoxy-";

Column 5, line 4, "as" should read -- an --;

Column 5, line 5, "10 24" should read -- 10 to 24 --;

Column 10, line 58, "signfi-" should read -- signifi- --;

UNITED STATES PATENT AND TRADEMARK OFFICE
CERTIFICATE OF CORRECTION

PATENT NO. : 4,214,054
DATED : July 22, 1980
INVENTOR(S) : Seizaburo Watanabe and Yutaka Matsuki It is certified that error appears in the above-identified patent and that said Letters Patent are hereby corrected as shown below:

Column 13, line 33, "preferably" should read -- preferable --;

Column 20, Table 6-continued, please insert --Evaluation-- and an underscore from column 4 to column 11, as shown correctly in the lower half of Table 6;

Column 20, Table 6-continued, column 10 heading "Dimensional Stabiity" should read -- Dimensional Stability --;

Column 23, Table 8, under Blowing Agents, "E: 1-chloro-1,1--difluorethane  20 parts" should read -- E: 1-chloro-1,1--difluoroethane  20 wt. parts --;

Column 24, Table 8, eighth heading "Feeding character- Surface Smoothness" should read -- Surface Smoothness --;

Column 24, Table 8, ninth heading "istic through extruder" should read -- Feeding characteristic through extruder --;

Column 23, Table 8, lower half, column heading "Blowing Agent" should read -- Blowing Agents --;

Column 23, Table 9, first column "Amount blowing" should read -- Amount of blowing --;

Column 25, Table 9-continued, under "Comparison example", example 22 should have the number 60 lined up correctly;

Column 27, line 35, please insert -- ; -- after "$R_5$";

UNITED STATES PATENT AND TRADEMARK OFFICE
CERTIFICATE OF CORRECTION

PATENT NO. : 4,214,054        Page 3 of 3
DATED : July 22, 1980
INVENTOR(S) : Seizaburo Watanabe and Yutaka Matsuki It is certified that error appears in the above-identified patent and that said Letters Patent are hereby corrected as shown below:

Column 27, line 52, and Column 28, line 62, "wherein means" should read -- wherein [$R_3$] means --;

Column 27, lines 51-58, and Column 28, lines 62-68, "1" should read -- $\ell$ --, except for the phrase "1 to 5 carbon atoms";

Column 27, line 59-61, Claim 2 should read as follows: --
2. An expanded article according to claim 1, wherein the olefin polymer is a polyethylene resin or an ethylenevinyl acetate copolymer resin. --;

Column 28, line 44, should read as follows:

-- wherein A' is hydrogen atom or $-\underset{\underset{O}{\|}}{C}-R_5$; --.

Signed and Sealed this

Sixteenth Day of December 1980

[SEAL]

Attest:

SIDNEY A. DIAMOND

Attesting Officer      Commissioner of Patents and Trademarks